United States Patent
Zhou et al.

(10) Patent No.: US 10,102,421 B2
(45) Date of Patent: Oct. 16, 2018

(54) METHOD AND DEVICE FOR FACE RECOGNITION IN VIDEO

(71) Applicant: PINHOLE (BEIJING) TECHNOLOGY CO., LTD., Beijing (CN)

(72) Inventors: Erjin Zhou, Beijing (CN); Qi Yin, Beijing (CN)

(73) Assignee: PINHOLE (BEIJING) TECHNOLOGY CO., LTD., Beijing (CN)

( * ) Notice: Subject to any disclaimer, the term of this patent is extended or adjusted under 35 U.S.C. 154(b) by 3 days.

(21) Appl. No.: 15/340,407

(22) Filed: Nov. 1, 2016

(65) Prior Publication Data
US 2017/0193286 A1    Jul. 6, 2017

(30) Foreign Application Priority Data
Dec. 31, 2015   (CN) .......................... 2015 1 1032506

(51) Int. Cl.
| G06K 9/00 | (2006.01) |
| G06K 9/66 | (2006.01) |
| G06T 7/00 | (2017.01) |
| G06T 3/20 | (2006.01) |
| G06K 9/46 | (2006.01) |
| G06K 9/62 | (2006.01) |

(52) U.S. Cl.
CPC ..... *G06K 9/00288* (2013.01); *G06K 9/00281* (2013.01); *G06K 9/00744* (2013.01); *G06K 9/629* (2013.01)

(58) Field of Classification Search
CPC .......... G06K 9/00281; G06K 9/00288; G06K 9/00228; G06K 9/00248; G06K 9/00744; G06K 9/00221; G06K 9/00261; G06K 9/00295; G06K 2009/4666; G06K 9/00268
See application file for complete search history.

(56) References Cited

U.S. PATENT DOCUMENTS

| 8,615,135 B2 * | 12/2013 | Kato ................. G06K 9/00248 382/201 |
| 9,405,960 B2 | 8/2016 | Yin et al. |
| 2013/0294642 A1 * | 11/2013 | Wang ................ G06F 17/30855 382/103 |
| 2015/0205997 A1 * | 7/2015 | Ma .................... G06K 9/00281 382/118 |
| 2015/0347822 A1 | 12/2015 | Zhou et al. |
| 2016/0140436 A1 | 5/2016 | Yin et al. |

\* cited by examiner

*Primary Examiner* — Kim Vu
*Assistant Examiner* — Michael Vanchy, Jr.
(74) *Attorney, Agent, or Firm* — Hamre, Schumann, Mueller & Larson, P.C.

(57) ABSTRACT

A method for face recognition in the video comprises: performing feature extraction on a target face in multiple image frames in the video to generate multiple face feature vectors respectively corresponding to the target face in the multiple image frames; performing time sequence feature extraction on the plurality of face feature vectors to convert the plurality of face feature vectors into a feature vector of a predetermined dimension; and judging the feature vector of the predetermined dimension by using a classifier so as to recognize the target face.

12 Claims, 2 Drawing Sheets

METHOD AND DEVICE FOR FACE RECOGNITION IN VIDEO

CROSS-REFERENCE TO RELATED APPLICATION

The present disclosure claims the benefits of and priority of Chinese patent application No. 201511032506.1 filed on Dec. 31, 2015, the disclosure of which is incorporated herein by reference in its entirety.

TECHNICAL FIELD OF THE DISCLOSURE

The present disclosure generally relates to image processing and pattern recognition, and particularly to method and device for face recognition in video.

BACKGROUND

In recent years, face recognition in a video has become an active research aspect in the field of face recognition. The technique for face recognition in a video has a wide application prospect in various aspects, such as security monitoring, intelligent identity verification, home entertainment or the like. Generally, the face recognition in the video refers to performing feature extraction on face areas detected in respective image frames of the video, comparing the features extracted from the respective frames with an existing face database, and finally recognizing identity of the face based on the comparison result.

According to existing methods for the face recognition in the video, image frames in a video are usually taken out frame by frame, then the faces in respective image frames are respectively compared with a face database and recognized, and when the comparison and recognition result of the respective frames satisfies a predetermined condition (for example, one same person is recognized in consecutive five frames), it is determined that a face is recognized. However, this recognition method is a static one and depends on independent comparison results of the respective frame images. Therefore, when some of the image frames in the video do not have high quality, the detection results thereof are not accurate, or the angles of the faces therein do not have corresponding samples in the face database, the accuracy of the recognition will be affected, resulting in low recognition accuracy.

SUMMARY

The present disclosure is made in view of the problems as described above.

According to an aspect of the present disclosure, there is provided a method for face recognition in a video comprising steps of: performing feature extraction on a target face in multiple image frames in the video to generate a plurality of face feature vectors respectively corresponding to the target face in the multiple image frames; performing time sequence feature extraction on the plurality of face feature vectors to convert the plurality of face feature vectors into a feature vector of a predetermined dimension; and judging the feature vector of the predetermined dimension by using a classifier to recognize the target face.

According to another aspect of the present disclosure, there is provided a device for face recognition in a video comprising: an extracting unit configured to perform feature extraction on a target face in multiple image frames in the video to generate a plurality of face feature vectors respectively corresponding to the target face in the multiple image frames; a converting unit configured to perform time sequence feature extraction on the plurality of face feature vectors to convert the plurality of face feature vectors into a feature vector of a predetermined dimension; and a recognizing unit configured to judge the feature vector of the predetermined dimension by using a classifier to recognize the target face.

According to yet another aspect of the present disclosure, there is provided a device for face recognition in a video comprising: a processor; a memory; and computer program instruction stored in the memory. The computer program instruction causes the device to perform the following steps when being run by the processor: performing feature extraction on a target face in multiple image frames in the video to generate a plurality of face feature vectors respectively corresponding to the target face in the multiple image frames; performing time sequence feature extraction on the plurality of feature vectors to convert the plurality of face feature vectors into a feature vector of a predetermined dimension; and judging the feature vector of the predetermined dimension by using a classifier to recognize the target face.

According to yet another aspect of the present disclosure, there is provided a computer program product for face recognition in a video, comprising computer readable storage medium with computer program instruction stored thereon. The computer program instruction can be executed by a processor to cause the processor to: perform feature extraction on a target face in multiple image frames in the video to generate a plurality of face feature vectors respectively corresponding to the target face in the multiple image frames; perform time sequence feature extraction on the plurality of face feature vectors to convert the plurality of face feature vectors into a feature vector of a predetermined dimension; and judge the feature vector of the predetermined dimension by using a classifier to recognize the target face.

The method, device and computer program product for face recognition in the video according to the present disclosure utilize a characteristic that the respective image frames in the video have correlation in the temporal dimension to extract the time sequence features of the multiple image frames in the video to represent the multiple image frames, thereby complementing information of the multiple image frames and improving the accuracy of the face recognition.

BRIEF DESCRIPTION OF THE DRAWINGS

Through the more detailed description of embodiments of the present disclosure with reference to the accompanying drawings, the above and other objects, features and advantages of the present disclosure will become more apparent. The drawings provide further understanding of the embodiments of the present disclosure, constitute part of the specification, explain the present disclosure together with the embodiments of the present disclosure and do not limit the present disclosure. In the drawings, the same reference signs generally refer to the same components or steps in the embodiments of the present disclosure.

DETAILED DESCRIPTION

In order to make the purpose, technical solution and advantage of the present disclosure obvious, a detailed description of the embodiments of the present disclosure will be given below with reference to the drawings of the embodiments. Obviously, the embodiments described herein are only part of, but not all of, the embodiments of the present disclosure. It is understood that the present disclosure should not be restricted by the exemplary embodiments described here. All the other embodiments which are made by those skilled in the art based on the embodiments of the present disclosure without any creative effort should fall into the protection range of the present disclosure.

Firstly, a basic idea of the technique for face recognition in the video according to the embodiments of the present disclosure will be briefly explained. As respective image frames in a video have correlation in a temporal dimension, for respective image frames in the video, in addition to extracting the static features thereof, the time sequence features thereof can be further extracted and utilized to complement the static information of the respective image frames, so as to improve the accuracy of the face recognition.

Figure 1:
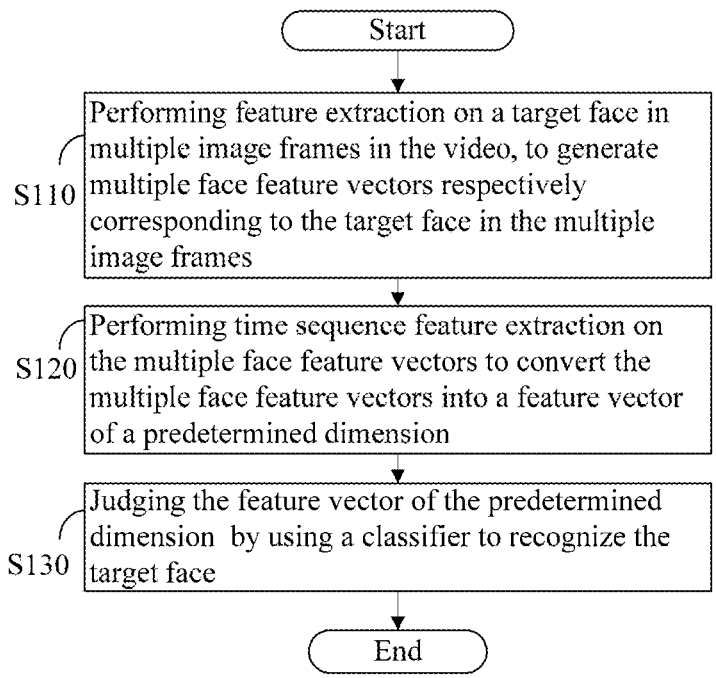
FIG. 1 schematically shows a flowchart of a method for face recognition in a video according to an embodiment of the present disclosure.

The method for face recognition in a video according to an embodiment of the present disclosure will be described below in detail with reference to FIG. 1. FIG. 1 schematically shows a flowchart of the method for face recognition in the video according to the embodiment of the present disclosure.

As shown in FIG. 1, at step S110, feature extraction is performed on a target face in multiple image frames in the video, to generate a plurality of face feature vectors respectively corresponding to the target face in the multiple image frames.

The multiple image frames are image frames including target face determined by performing face detection and face tracking process on the respective image frames in the video. In specific, size and position of the target face can be determined in an initial image frame including the target face by performing commonly used face detection methods known in the art, such as template matching, Support Vector Machine (SVM), neural network or the like. Subsequently, the target face is tracked based on color information, local features, motion information or the like of the target face, so that the image frames in the video including the target face can be determined. The process of determining the image frames including the target face by performing face detecting and face tracking process as described above is a common process in the field of image processing, and thus will not be described here in detail.

It is to be noted that the multiple image frames are not necessary to be all the image frames in the video including the target face, but can be only a part of them. On the other hand, the multiple image frames can be a plurality of consecutive image frames or can be a plurality of arbitrarily selected image frames which are not consecutive.

In step S110, various suitable face feature extraction methods, such as Local Binary Pattern (LBP), Histogram of Oriented Gradient (HoG), Principal Component Analysis (PCA), neural network or the like, can be used to perform the feature extraction and generate the plurality of face feature vectors. In one embodiment, a same feature extraction method is used for the target face in each of the multiple image frames to generate the face feature vectors corresponding to the target face in the image frames, respectively. The face feature extraction method used in the present embodiment will be briefly described below.

As an example, in one embodiment, a feature extraction method based on the convolutional neural network (CNN) is used to perform the feature extraction on the target face in the multiple image frames in the video, so as to generate the plurality of face feature vectors respectively corresponding to the target face in the multiple image frames. According to the example, firstly, for each of the multiple image frames, a face image area therein corresponding to the target face is determined, and then the feature extraction method based on convolutional neural network is performed on the face image area so as to generate a face feature vector corresponding to the target face in the image frame. Herein, the feature extraction method can be either performed by taking the face image area as a whole or performed in different sub image areas of the face image area, respectively. Hereinafter, the latter will be described with reference to FIG. 2.

Figure 2:
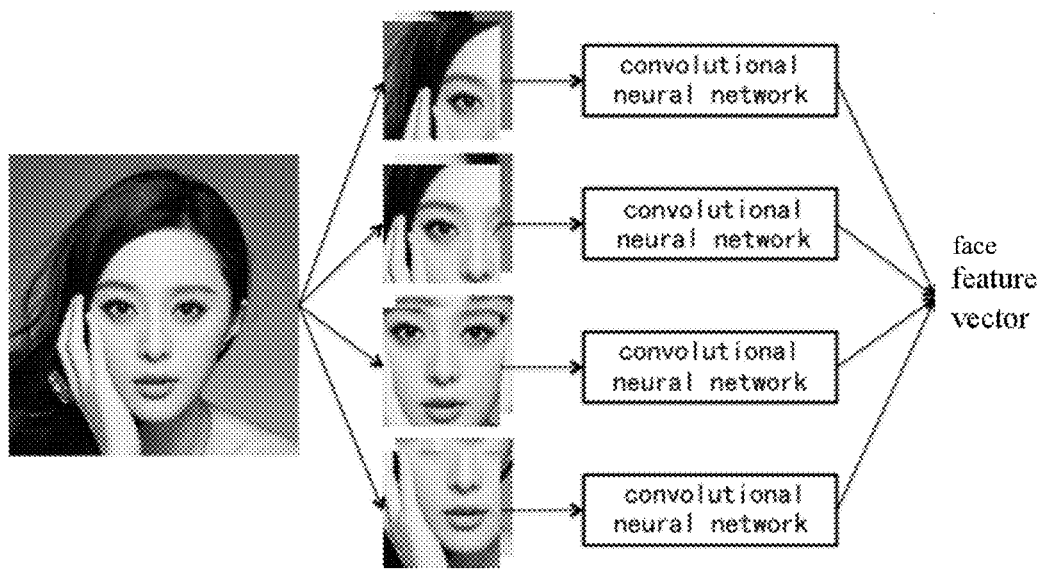
FIG. 2 shows an exemplary application of extracting features respectively from different sub image areas of the face image area according the method for face recognition in the video of the embodiment of the present disclosure.

In specific, the feature extraction can be respectively performed in different sub image areas of the face image area by following processes: (a) sliding with a slide window across the face image area; (b) performing, for each of positions which are slid to, feature extraction on a sub image area contained therein, to generate a feature vector corresponding to the sub image area; (c) combining the plurality of generated feature vectors into a feature vector to generate the face feature vector corresponding to the target face in the image frame. In process (a), the sliding window may be selected to have a suitable size arbitrarily depending on specific situation and may be slid across the face image area, and the size of the slide window may be either fixed or appropriately changed during the sliding. A step and a path of the sliding can be arbitrarily set depending on requirement, and the slide window may slide to traverse the entire face image area or traverse part of the face image area. In process (c), the plurality of generated feature vectors can be combined into one feature vector by the manners of, for example, superposing, or the like. FIG. 2 shows an exemplary application of the process of extracting the features from the different sub image areas of the face image area, respectively. As shown in FIG. 2, the larger view shown in the left side is a face image area corresponding to the target face in a certain image frame; the multiple smaller views in the middle of FIG. 2 are individual sub image areas contained in respective positions which are slid to in process (a); and the multiple blocks of convolutional neural network processing shown in the right side of FIG. 2 represent performing the feature extraction based on the convolutional neural network on each of the sub image areas obtained through the sliding procedure to generate the feature vector corresponding to the sub image area; and finally, the face feature vector corresponding to the larger view in the left side of FIG. 2 is obtained by combining the plurality of generated feature vectors.

At step S120, time sequence feature extraction is performed on the plurality of face feature vectors to convert the plurality of face feature vectors into a feature vector of a predetermined dimension.

As described above, the image frames in the video have correlation in the temporal dimension. In this step, the plurality of face feature vectors having time sequence characteristics generated in step S110 are converted into the feature vector of the predetermined dimension by extracting the time sequence features from the plurality of face feature vectors. The predetermined dimension is a dimension of the respective feature vectors in a face feature vector library established in advance. After the plurality of face feature vectors are converted into the feature vector of the predetermined dimension in this step, the converted feature vector has the same dimension as the respective feature vectors in the face feature vector library established in advance, and thus can be compared and recognized in the subsequent processes.

The conversion may be performed in various suitable manners in the art in this step. Taking employing the recurrent neural network as an example, the time sequence feature extraction can be performed on the plurality of face feature vectors so as to convert the face features vectors into the feature vector of the predetermined dimension as expressed in following equation (1):

$$h(t)=f_1(W1 \times h(t-1)+W2 \times s(t)+b1)$$
$$p(t)=f_2(W3 \times h(t)+b2) \quad (1)$$

Wherein, s(t) is an input to the recurrent neural network, and represents a face feature vector corresponding to the target face in the image frame at time t in the video; h(t) is a state of a hidden layer of the recurrent neural network at time t, and h(−1) is generally set to zero vector when being implemented; p(t) is an output of the recurrent neural network, and represents a feature vector obtained by converting the plurality of face feature vectors corresponding to the target face in multiple image frames, e.g., image frames that have been captured until time t, in one embodiment, p(t) can be the feature vector of a predetermined dimension, and it can be understood that p(t) may be considered as a feature vector representation of the target face at time t; $f_1$ and $f_2$ are both non-linear functions, such as tan h(x), sigmoid(x), max(x,0) or the like; W1, W2 and W3 are linear transformation matrices; and b1 and b2 are constant vectors. These parameters can be obtained by training samples in advance.

As described above, the recurrent neural network is only an exemplary manner for converting the plurality of face feature vectors into the feature vector of the predetermined dimension, but not a limitation to the present disclosure. Other converting manners can also be used by those skilled in the art, as long as the time sequence features of the plurality of face feature vectors can be extracted and the plurality of face feature vectors can be converted into the feature vector of the predetermined dimension. For instance, as an example, a first-order Markov model can be used to perform the conversion. As another example, as a basic method, the plurality of face feature vectors can be superposed, e.g., directly superposed, in the temporal dimension so as to obtain a superposed feature vector, and then dimension reduction can be performed on the superposed feature vector obtained from superposing so as to obtain the feature vector of the predetermined dimension. Compared with employing the recurrent neural network, the method of superposing has a weak capability of feature extraction.

At step S130, the feature vector of the predetermined dimension is judged by using a classifier to recognize the target face.

The classifier is obtained by learning in advance, and the common classifiers such as SVM, Adaboost, neural network or the like in the art can be used. Taking using the neural network as an example, as expressed in the following equation (2), the feature vector of the predetermined dimension obtained in step S120 can be judged to recognize the target face:

$$u1 = f3(W4 \times p(t) + b3) \quad (2)$$
$$u2 = \mathrm{softmax}(W5 \times u1 + b4)$$
$$\mathrm{softmax}(x_i) = \frac{e^{x_i}}{\sum_{i=1}^{n} e^{x_i}}$$

Wherein, p(t) is the feature vector representation of the target face at time t, as described above; u2 is a probability distribution; softmax($x_i$) is a normalized probability; $f_3$ is a non-linear function, such as tan h(x), sigmoid(x), max(x,0) or the like; n is the number of the classifiers; W4 and W5 are linear transformation matrices; and b3 and b4 are constant vectors. These parameters can be obtained by training the samples in advance.

With the classifier as expressed by equation (2), the feature vector of the predetermined dimension obtained in step S120 can be judged, and the target face is determined to be the class corresponding to the normalized probability of highest score, thereby recognizing the target face.

The method for face recognition in the video according to the embodiment of the present disclosure has been described above. In this method, based on the characteristics that the respective image frames in the video have correlation in the temporal dimension, the time sequence features of the multiple image frame in the video are extracted to represent the multiple image frames, thereby complementing the information of the multiple image frame and improving the accuracy of the face recognition.

Figure 3:
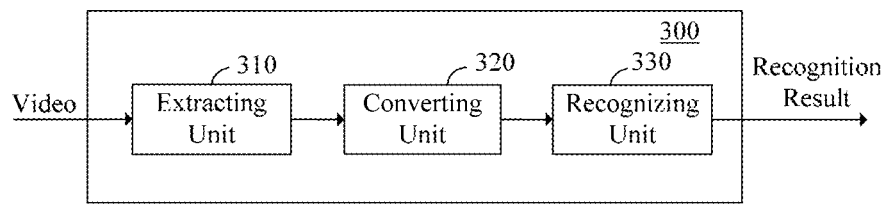
FIG. 3 shows an exemplary structural block diagram of a device for face recognition in a video according to an embodiment of the present disclosure.

In the following, a device for face recognition in the video according to an embodiment of the present disclosure will be described with reference to FIG. 3. FIG. 3 shows an exemplary structural block diagram of the device 300 for face recognition in the video according to the present embodiment. As shown in FIG. 3, the device 300 may include extracting unit 310, converting unit 320 and recognizing unit 330, which may perform the respective steps/functions of the method for face recognition in the video as described above in connection with FIGS. 1 and 2, respectively. Only the main functions of the respective units of the device 300 for face recognition in the video will be described below, and the detailed contents which have been described above will be omitted.

The extracting unit 310 performs feature extraction on the target face in multiple image frames in the video to generate a plurality of face feature vectors corresponding to the target face in the multiple image frames.

The multiple image frames are image frames including target face determined by performing face detection and face tracking process on the respective image frames in the video. It is to be noted that the multiple image frames are not necessary to be all the image frames in the video including the target face, but can be only a part of them. On the other hand, the multiple image frames can be a plurality of consecutive image frames or can be a plurality of arbitrarily selected image frames which are not consecutive.

The extracting unit 310 can adopt various suitable face feature extraction methods, such as Local Binary Pattern (LBP), Histogram of Oriented Gradient (HoG), Principal Component Analysis (PCA), neural network or the like, to perform the feature extraction and generate the plurality of face feature vectors. In one embodiment, a same feature extraction method is used for the target face in each of the multiple image frames to generate the face feature vectors corresponding to the target face in the image frames, respectively.

As an example, the extracting unit 310 can use a feature extraction method based on the convolutional neural network to perform the feature extraction on the target face in the multiple image frames in the video, so as to generate the plurality of face feature vectors respectively corresponding to the target face in the multiple image frames. According to the example, firstly, for each of the multiple image frames, the extracting unit 310 determines a face image area therein corresponding to the target face, and then performs the feature extraction based on convolutional neural network on the face image area so as to generate a face feature vector corresponding to the target face in the frame of image. Herein, the feature extraction can be either performed by taking the face image area as a whole or performed in different sub image areas of the face image area, respectively. In specific, with respect to the latter, the extracting unit 310 can perform the feature extraction in different sub image areas of the face image area by following processes: (a) sliding with a slide window across the face image area; (b) performing, for each of positions which are slid to, feature extraction on a sub image area contained therein, to generate a feature vector corresponding to the sub image area; (c) combining the plurality of generated feature vectors into a feature vector to generate the face feature vector corresponding to the target face in the image frame.

The converting unit 320 performs time sequence feature extraction on the plurality of face feature vectors to convert the plurality of face feature vectors into a feature vector of a predetermined dimension. As described above, the image frames in the video have correlation in the temporal dimension, and thus the converting unit 320 converts the plurality of face feature vectors having time sequence characteristics generated by the extracting unit 310 into the feature vector of the predetermined dimension by extracting the time sequence features from the plurality of face feature vectors. The predetermined dimension is a dimension of the feature vectors in a face feature vector library established in advance.

The converting unit 320 may perform the conversion in various suitable manners in the art. For example, the converting unit 320 may employ the recurrent neural network, and perform the time sequence feature extraction on the plurality of face feature vectors so as to convert them into the feature vector of the predetermined dimension as expressed in the above equation (1). The recurrent neural network certainly is only an exemplary manner for converting the plurality of face feature vectors into the feature vector of the predetermined dimension, but not a limitation to the present disclosure. Other converting manners can also be employed by those skilled in the art, as long as the time sequence features of the plurality of face feature vectors can be extracted and the plurality of face feature vectors can be converted into the feature vectors of the predetermined dimension. For instance, as an example, the converting unit 320 may use a first order Markov model to perform the conversion. As another example, as a basic method, the converting unit 320 may superpose, e.g., directly superpose, the plurality of face feature vectors in the temporal dimension so as to obtain a superposed feature vector, and then perform dimension reduction on the superposed feature vector obtained from superposing procedure so as to obtain the feature vector of the predetermined dimension.

The recognizing unit 330 judges the feature vector of the predetermined dimension by using a classifier so as to recognize the target face. The classifier is obtained by learning in advance and the commonly used classifiers such as SVM, Adaboost, neural network or the like in the art can be used. Taking using the neural network as an example, the recognizing unit 330 can determine the feature vector of the predetermined dimension generated by the converting unit 320 to recognize the target face, as expressed in the above equation (2).

The device 300 for face recognition in the video according to the embodiment of the present disclosure has been described above. The device utilizes the characteristics that the respective image frames in the video have correlation in the temporal dimension, and extracts the time sequence features of the multiple image frames in the video to represent the multiple image frames, thereby complementing the information of the multiple image frames and improving the accuracy of the face recognition.

In the following, a schematic block diagram of a computing device which can be used for implementing the device for face recognition in the video of the embodiment of the present disclosure will be described with reference to FIG. 4. The computing device can be a computer or a server equipped with a camera.

Figure 4:
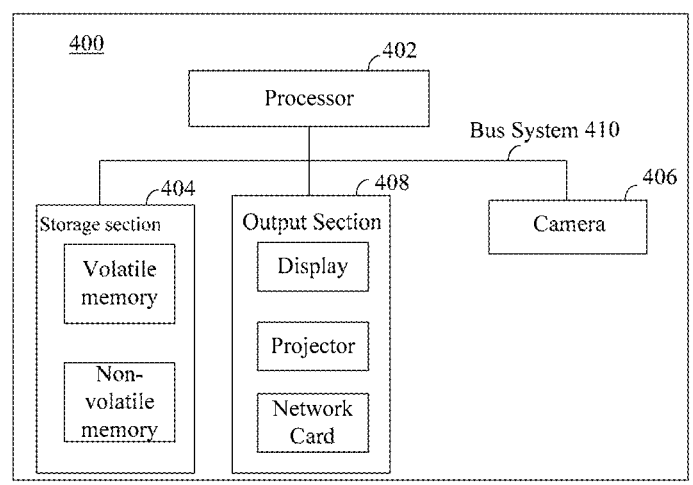
FIG. 4 shows a schematic block diagram of a computing device which can be used for implementing the device/method for face recognition in the video of the embodiment of the present disclosure.

As shown in FIG. 4, the computing device 400 includes one or more processors 402, a storage section 404, a camera 406 and an output section 408. These components are interconnected through bus system 410 and/or other forms of connection mechanism (not shown). It is to be noted that the components and the structure of the computing device 400 shown in FIG. 4 is only an example but not a limitation, and the computing device 400 may have other components and structures as needed.

The processor 402 can be a central processing unit (CPU) or other forms of processing unit having data processing capability and/or instruction executing capability, and can control other components in the computing device 400 to perform desired function.

The storage section 404 can include one or more computer program products which can include a variety of computer readable storage mediums, for example, volatile memory and/or non-volatile memory. The volatile memory can include random access memory (RAM) and/or cache. The non-volatile memory can include read only memory (ROM), hard disk, flash memory and so on, for example. One or more computer program instructions can be stored on the computer readable storage medium and can be executed by the processor 402 to realize the function of the face recognition device of the embodiments of the present disclosure as described above and/or other desired functions, and/or perform the face recognition method according to the embodiments of the present disclosure. The computer readable storage medium can further store therein various applications and data, such as the plurality of face feature vectors corresponding to the target face in the multiple image frames, the converted feature vector of the predetermined dimension, the size and the slide path of the sliding window, the predetermined dimension, or the like.

The camera 406 is used for capturing the video and/or image to be analyzed and storing the captured video in the storage section 404 to be used by other components. Other capturing devices may certainly be used to capture the video and transmit the video to the computing device 400. In this case, the camera 406 may be omitted.

The output section 408 may output (for example, to the user) various information, such as image information, sound information, face recognition result, and may include at least one of display screen, loudspeaker, and so on.

In particular, the computer program instructions stored in the storage section 404, when executed by the processor 402, causes the computing device 400 to perform the steps of: performing feature extraction on a target face in a plurality of image frames in the video to generate a plurality of face feature vectors respectively corresponding to the target face in the plurality of image frames; performing time sequence feature extraction on the plurality of face feature vectors to convert the plurality of face feature vectors into a feature vector of a predetermined dimension; and judging the feature vector of the predetermined dimension by using a classifier to recognize the target face.

In one embodiment, the plurality of image frames comprises a plurality of consecutive image frames in the video.

Further, the step of performing feature extraction on the target face in the plurality of image frames in the video to generate the plurality of face feature vectors respectively corresponding to the target face in the plurality of image frames performed by the computing device 400, caused by the computer program instruction read by the processor 402, comprises: using a same feature extraction method for the target face in each of the plurality of image frames to generate the plurality of face feature vectors corresponding to the target face in the image frames, respectively.

Further, the step of performing feature extraction on the target face in the plurality of image frames in the video to generate the plurality of face feature vectors respectively corresponding to the target face in the plurality of image frames performed by the computing device 400, caused by the computer program instruction read by the processor 402, comprises: determining a face image area corresponding to the target face in each image frame of the plurality of image frames; and performing the feature extraction on the face image area to generate the face feature vector corresponding to the target face in the image frame.

Further, the step of performing the feature extraction on the face image area to generate the face feature vector corresponding to the target face in the image frame performed by the computing device 400, caused by the computer program instruction read by the processor 402, comprises: sliding with a slide window across the face image area; performing, for each of positions which are slid to, feature extraction on a sub image area contained therein, to generate a feature vector corresponding to the sub image area; and combining the plurality of generated feature vectors into a feature vector to generate the face feature vector corresponding to the target face in the image frame Further, the step of performing the time sequence feature extraction on the plurality of face feature vectors to convert the plurality of face feature vectors into the feature vector of the predetermined dimension, performed by the computing device 400, caused by the computer program instruction read by the processor 402, comprises: superposing the plurality of face feature vectors to generate a superposed feature vector; and performing dimension reduction on the superposed feature vector to generate the feature vector of the predetermined dimension.

Further, the step of performing the time sequence feature extraction on the plurality of face feature vectors to convert the plurality of face feature vectors into the feature vector of the predetermined dimension performed by the computing device 400, caused by the computer program instruction read by the processor 402, comprises: performing the time sequence feature extraction on the plurality of face feature vectors by using a recurrent neural network to convert the plurality of face feature vectors into the feature vector of the predetermined dimension.

Further, the predetermined dimension is a dimension of the respective feature vectors in a face feature vector library established in advance.

A computer program product is provided according to an embodiment of the present disclosure, which includes a computer readable medium having stored thereon computer program instructions, wherein the computer program instructions are executable by a device for causing the device to perform individual steps of the method for face recognition in a video as described above. For example, the computer program instructions, when executed by the computer, may cause the device to perform at least the following: performing feature extraction on a target face in a plurality of image frames in the video to generate a plurality of face feature vectors respectively corresponding to the target face in the plurality of image frames; performing time sequence feature extraction on the plurality of face feature vectors to convert the plurality of face feature vectors into a feature vector of a predetermined dimension; and judging the feature vector of the predetermined dimension by using a classifier to recognize the target face.

The main principles of the present disclosure have been described above with reference to the drawings. However, it is to be noted that the advantage, predominance, effect and so on are merely exemplary but not limited, and should not be interpreted to be necessary for the embodiments of the present disclosure. In addition, the specific details are disclosed only for the purpose of illustration and convenience of understanding but not for limitation. These details will not restrict the present disclosure to be implemented by employing these details necessarily.

The block diagrams of the devices, means, apparatus and system involved in the present disclosure are only illustrative examples and not intended to require or imply that they should be connected, arranged or configured in the manner shown in the diagrams. As will be realized by those skilled in the art, these devices, means, apparatus and system can be connected, arranged or configured in any way. The terms such as "including", "comprising", "having" or the like are open-meaning words, refer to "including but not limited to", and can be exchanged therewith. The terms of "or" and "and" used herein refer to "and/or" and can be exchanged therewith unless the context explicitly indicates not. The terms of "such as" used herein refer to "such as but not limited to" and can be exchanged therewith.

In addition, as used herein, the word of "or" used in the list of items beginning with "at least of one" indicates separate listing so that the list of "at least one of A, B or C" means A or B or C, AB or AC or BC, or ABC (that is, A and B and C). In addition, the term of "exemplary" does not indicate that the example in question is preferable or better than other examples.

It is also to be noted that in the device and method of the present disclosure, the parts or the steps can be divided and/or re-combined. The division and/or recombination should be considered as equivalent solutions of the present disclosure.

Various change, replacement or alternation to the present disclosure can be made without departing from the techniques defined in the claims. In addition, the scope of the claims of the present disclosure is not limited to the specific aspects of process, machine, manufacturing, composition of event, measure, method and action as described above. The process, machine, manufacturing, composition of event, measure, method and action which are currently existing or to be developed in the future and can perform substantially the same function or achieve substantially the same effect as the corresponding aspect as described here can be employed. Therefore, such process, machine, manufacturing, composition of event, measure, method and action are within the scope of the appended claims.

The above description of the aspects of the present disclosure is provided to enable those skilled in the art to make or use the present disclosure. Various modifications to these aspects are obvious to those skilled in the art and the general principles defined here can be applied to other aspects without departing from the scope of the present disclosure. Therefore, the present disclosure is not intended to be restricted to the aspects disclosed here and should accord to the broadest scope consistent with the principles and novel features disclosed here.

The above description is given in the purpose of illustration and explanation. In addition, the description is not intended to restrict the embodiments of the present disclosure to the form disclosed here. Although a plurality of exemplary aspects and embodiments have been discussed, those skilled in the art can conceive of other alternation, modification, change, addition and sub-combination thereof.

What is claimed is:

1. A method for face recognition in a video, comprising:
performing static feature extraction on a target face in a plurality of image frames in the video to generate a plurality of static face feature vectors respectively corresponding to the target face in the plurality of image frames;
performing time sequence feature extraction on the plurality of static face feature vectors by using a recurrent neural network to convert the plurality of static face feature vectors into a time sequence feature vector of a predetermined dimension; and
judging the time sequence feature vector of the predetermined dimension by using a classifier to recognize the target face.

2. The method for face recognition according to claim 1, wherein the plurality of image frames comprises a plurality of consecutive image frames in the video.

3. The method for face recognition according to claim 1, wherein performing static feature extraction on the target face in the plurality of image frames in the video to generate the plurality of static face feature vectors respectively corresponding to the target face in the plurality of image frames further comprises:
using a same static feature extraction method for the target face in each of the plurality of image frames to generate the plurality of static face feature vectors corresponding to the target face in the image frames, respectively.

4. The method for face recognition according to claim 3, wherein performing static feature extraction on the target face in the plurality of image frames in the video to generate the plurality of static face feature vectors respectively corresponding to the target face in the plurality of image frames further comprises:
determining a face image area corresponding to the target face in each image frame of the plurality of image frames; and
performing the static feature extraction on the face image area to generate the static face feature vector corresponding to the target face in the image frame.

5. The method for face recognition according to claim 4, wherein performing the static feature extraction on the face image area to generate the static face feature vector corresponding to the target face in the image frame further comprises:
sliding with a slide window across the face image area;
performing, for each of positions which are slid to, static feature extraction on a sub image area contained therein, to generate a static feature vector corresponding to the sub image area; and
combining the plurality of generated static feature vectors into a static feature vector to generate the static face feature vector corresponding to the target face in the image frame.

6. The method for face recognition according to claim 1, wherein the predetermined dimension is a dimension of respective time sequence feature vectors in a time sequence face feature vector library established in advance.

7. A device for face recognition in a video comprising:
a processor;
a memory; and
computer program instructions stored in the memory which cause the device to perform the following steps when being run by the processor:
performing static feature extraction on a target face in a plurality of image frames in the video to generate a plurality of static face feature vectors respectively corresponding to the target face in the a plurality of image frames;
performing time sequence feature extraction on the plurality of static face feature vectors by using a recurrent neural network to convert the plurality of static face feature vectors into a time sequence feature vector of a predetermined dimension; and
judging the time sequence feature vector of the predetermined dimension by using a classifier to recognize the target face.

8. The device for face recognition according to claim 7, wherein the plurality of image frames comprises a plurality of consecutive image frames in the video.

9. The device for face recognition according to claim 7, wherein performing static feature extraction on the target face in the plurality of image frames in the video to generate the plurality of static face feature vectors respectively corresponding to the target face in the plurality of image frames, performed by the device caused by the computer program instructions read by the processor, further comprises:
using a same static feature extraction method for the target face in each of the plurality of image frames to generate the plurality of static face feature vectors corresponding to the target face in the image frames, respectively.

10. The device for face recognition according to claim 9, wherein performing static feature extraction on the target face in the plurality of image frames in the video to generate the plurality of static face feature vectors respectively corresponding to the target face in the plurality of image frames, performed by the device caused by the computer program instructions read by the processor, further comprises:
determining a face image area corresponding to the target face in each image frame of the plurality of image frames; and
performing the static feature extraction on the face image area to generate the static face feature vector corresponding to the target face in the image frame.

11. The device for face recognition according to claim 10, wherein performing the static feature extraction on the face image area to generate the static face feature vector corresponding to the target face in the image frame, performed by the device caused by the computer program instructions read by the processor, further comprises:

sliding with a slide window across the face image area;

performing, for each of positions which are slid to, static feature extraction on a sub image area contained therein, to generate a static feature vector corresponding to the sub image area; and combining the plurality of generated static feature vectors into a static feature vector to generate the static face feature vector corresponding to the target face in the image frame.

12. The device for face recognition according to claim 7, wherein the predetermined dimension is a dimension of respective time sequence feature vectors in a time sequence face feature vector library established in advance.

\* \* \* \* \*